United States Patent [19]

Schwartzman

[11] 3,995,431
[45] * Dec. 7, 1976

[54] COMPOUND BRAYTON-CYCLE ENGINE

[76] Inventor: Everett H. Schwartzman, 724 Cloyden Road, Palos Verdes Estates, Calif. 90274

[ * ] Notice: The portion of the term of this patent subsequent to Mar. 19, 1991, has been disclaimed.

[22] Filed: Mar. 18, 1974

[21] Appl. No.: 452,168

Related U.S. Application Data

[63] Continuation-in-part of Ser. No. 279,552, Aug. 10, 1972, Pat. No. 3,797,247.

[52] U.S. Cl. .................................. 60/684; 60/682
[51] Int. Cl.² ............................................ F01K 25/02
[58] Field of Search ............ 60/684, 685, 683, 680, 60/682, 650

[56] References Cited
UNITED STATES PATENTS

| | | | |
|---|---|---|---|
| 2,298,625 | 10/1942 | Larrecq | 60/683 X |
| 2,420,335 | 5/1947 | Nettel et al. | 60/683 |
| 2,421,387 | 6/1947 | Lysholm | 60/683 X |
| 2,478,851 | 8/1949 | Traupel | 60/683 X |
| 2,659,194 | 11/1953 | Huber | 60/624 X |
| 2,994,198 | 8/1961 | Snyder | 60/682 X |
| 3,503,205 | 3/1970 | Suter | 60/684 X |
| 3,797,247 | 3/1974 | Schwartzman | 60/DIG. 1 |

*Primary Examiner*—Alan Cohan
*Assistant Examiner*—Gerald A. Michalsky
*Attorney, Agent, or Firm*—Henry M. Bissell

[57] ABSTRACT

A system is disclosed incorporating a positive-displacement compressor-and-engine arrangement for converting heat of a working fluid to attain a pressure increase in a working fluid that is supplied to a turbine system. The system employs a heater interposed to pass exhaust fluid from the drive engine to the turbine system at an elevated temperature. As disclosed, the housing of the compressor-and-drive structure incorporates cooling apparatus, for example so that the reciprocating compressor may approach isothermal operation. Also, the turbine system is divided into one unit which supplies mechanical output power and another to drive a rotary compressor or supercharger, which supplies intake fluid to the positive-displacement compressor, the output of which supplies the positive-displacement engine.

10 Claims, 3 Drawing Figures

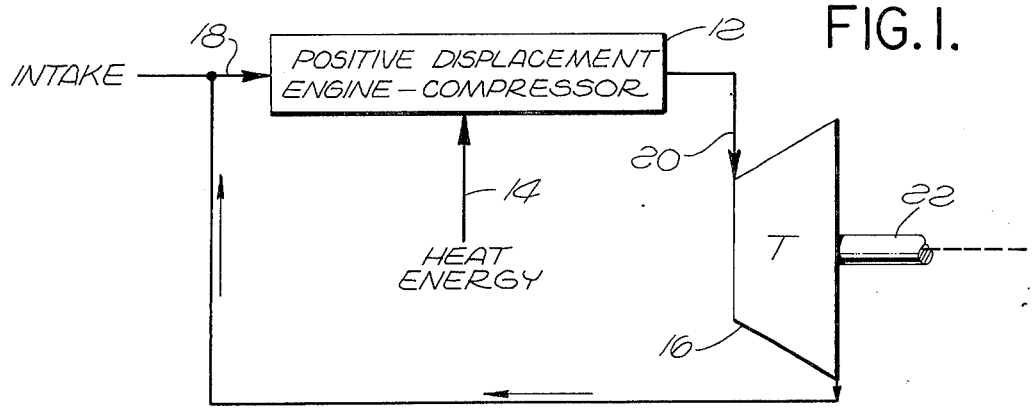
FIG. 1.
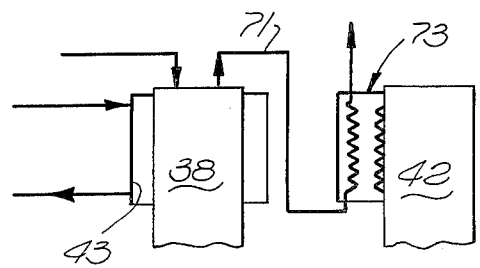
FIG. 2.
FIG. 3.

COMPOUND BRAYTON-CYCLE ENGINE

CROSS-REFERENCE TO RELATED APPLICATION

This application is a continuation-in-part of co-pending application Ser. No. 279,552, filed Aug. 10, 1972, entitled COMPOUND BRAYTON-CYCLE ENGINE, now U.S. Pat. No. 3,797,247.

BACKGROUND AND SUMMARY OF THE INVENTION

In recent years, a vast effort has been directed toward developing an improved heat engine. Generally, the motive for that effort resides in the vast number of existing internal combustion engines having created a significant problem of atmospheric contamination. In operation, the conventional internal-combustion gasoline engine utilizes fuel in rapidly-occurring detonations, with the result that the combustion products frequently include live hydrocarbons, nitrogen oxides and other contaminants. Additionally, the conventional internal combustion engine has evolved to a rather complex mechanism and efficiency has been pushed substantially to the limits of production capabilities. Consequently, the need is widely recognized for an improved basic engine as for automotive use. The desirable characteristics for such an engine include good speed response, relatively-high efficiency, high power output and desirable torque-speed characteristics. Furthermore, the system should be easy to start and capable of being embodied in a simple design that is reliable and inexpensive.

The gas turbine has been recognized as a very useful engine in many applications and has been considered for automotive use. However, one of the major difficulties with that engine in automotive applications is poor speed response. Another problem resides in the difficulty of providing effective cooling. Although internally-cooled structures have been proposed, they tend to be rather complex both in manufacture and operation. Within the purview of these considerations, the system of the above-referenced patent was developed. However, further research and effort has resulted in the subsequent development hereof.

In general, the present invention is directed to a system affording a significant improvement in the characteristics considered above and which system would be well adapted for automotive use. The system involves the utilization of a positive-displacement compressor and drive engine, in cooperation with rotary apparatus, e.g. a turbine and compressor. In the exemplary embodiment, the heater provides drive fluid to a turbine system, which fluid is discharged to pass through a regenerator. A compressor (driven by the turbine) is supplied with fluid through the positive-displacement compressor and the regenerator to the positive-displacement engine, which is in turn connected to the heater.

BRIEF DESCRIPTION OF THE DRAWINGS

In the drawings, which constitute a part of this specification, exemplary embodiments exhibiting various objectives and features hereof are set forth, specifically:

FIG. 1 is a diagrammatic representation of the system of the present invention;

FIG. 2 is a detailed schematic diagram of an exemplary embodiment constructed in accordance with the present invention; and FIG. 3 is a sectional view of an engine structure illustrating an alternative form as may be utilized in the system of FIG. 2.

DESCRIPTION OF THE ILLUSTRATIVE EMBODIMENT

As required, a detailed illustrative embodiment of the invention is disclosed herein. The embodiment exemplifies the invention which may, of course, be embodied in other forms, some of which may be radically different from the illustrative embodiment as disclosed. However, the specific structural details disclosed herein are representative and they provide a basis for the claims which define the scope of the present invention.

Referring initially to FIG. 1, the system is very generally indicated to include a positive-displacement engine-compressor structure 12 which is driven by heat energy as indicated by an input arrow 14, to provide working fluid at a pressure to operate a turbine 16. The structure 12 might receive air as a working fluid through an intake 18, heat the air to drive the engine-compressor 12 (which compresses air at the intake), then provide the air at a substantially-increased pressure through a duct 20 to drive the turbine system 16. The turbine system 16 then provides mechanical power to an output shaft 22. Thus, high pressure ratios are attained by a simple mechanism which has several attendant and unobvious advantages including improved speed response.

Considering the structure hereof in somewhat greater detail, reference will now be made to FIG. 2 wherein a positive-displacement structure 24 is illustrated as an in-line apparatus, to operate in cooperation with a turbine structure 26. As indicated above, the structure 24, along with a heater 28, provides pressurized working fluid for driving the turbine structure 26. Considering the flow paths in detail, a working fluid, e.g. air, is drawn through an intake 30, compressed by a rotary unit 32 then cooled by a cooler 34 and supplied through a check valve 36 to the compressor side 38 of the positive-displacement structure 24 (actuating valves and related structure not shown). The structure 24 incorporates a piston 40 serving the compressor side 38 and a piston 41 serving the side 42. Of course, a variety of arrangements are practical including several well-known structures, e.g. opposed pistons or units as disclosed in the referenced patent.

The compressor side 38 incorporates cooling apparatus, e.g. a jacket 43 which is connected to receive coolant from a cooling system 45.

Returning to consider the main flow, as a result of the cooling, the working fluid is exhausted from the compressor side 38 through a check valve 46 at a temperature which is not significantly higher than the temperature of the fluid that is received from the cooler 34. Initial heating of the fluid from the compressor side 38 is in a heat exchanger or regenerator 48 in which the working fluid is heated by exhaust working fluid as described in greater detail below.

From the regenerator 48, the working fluid passes to the engine side 42 of the positive-displacement structure 24. The engine side 42 also embodies a cooling apparatus. Specifically, a jacket 57 receives coolant from a system 59. Of course, as with the similar system for the compressor side 38, many specific structures and arrangements may be employed. The engine side 42 includes valve structure 53 as with a mechanical control 55 well known in the art so that the working fluid exhausting from the engine side 42 is highly pressurized but somewhat cooled and accordingly, is well suited for introduction to the primary heater 28, which may comprise any of a variety of combustion systems or simply a source of heat, which may be waste heat. In any event, the working fluid is increased in temperature in the heater 28 thereby attaining a relatively high temperature at which the working fluid is introduced into the turbine structure 26. Essentially, the turbine structure 26 includes two somewhat distinct units, i.e. a first turbine 50 and a second turbine 52. The first turbine 50 is connected through a rotary shaft 54 to a gear box 53 having a power drive shaft 60. The second turbine 52 is connected through a shaft 56 to the rotary unit 32 (compressor). The first turbine 50 exhausts through an auxiliary heater 61 (which is structurally integrated with the heater 28) to the second turbine 52. Essentially, the auxiliary heater may simply be a secondary heat exchanger in the primary heater 28. The heater 61 can be employed as a control means in an operating system. The turbine structure 26 exhausts (from the turbine 52) through the regenerator 48. Specifically, a fluid passage 62 carrying the exhaust from the turbine 52 is in heat-transfer relationship with the passage 64 which passes the working fluid prior to application to the compressor side 38.

In view of the above structural description of the system of FIG. 2, certain operating characteristics may now be considered. Initially, assuming the system is in an operating stage, air (or other working fluid) is drawn into the rotary compressor unit 32 for an initial compression to increase the pressure of the working fluid. Such a preliminary compression operation is useful in certain applications in view of the relatively-limited displacement of reciprocating or positive-displacement equipment.

Returning to consider the cooler 34, which receives the working fluid from the unit 32, the former may comprise simply a radiator for returning the preliminarily pressurized fluid to a temperature near ambient. Upon introduction of the preliminarily pressurized working fluid from the cooler 34 into the compressor side 38 of the structure 24, the pressure is substantially increased. Next, the temperature of the fluid is initially increased in the regenerator 48 and supplied to the engine side 42. The working fluid drives the engine side 42 then exhausts through the heater 28 to the turbine 50. The fluid from the heater 28 is well suited to drive the turbine 50 followed by the turbine 52.

In considering the operation of the system in a more-detailed fashion, a number of features are significant. First, the heater 28 may involve a lean fuel mixture designed for complete combustion without the contaminants that are generally attendant the exhaust from internal combustion engines. Second, the system tends to be nonpolluting in view of the fact that it may be embodied in a unit with good efficiency therefore consuming less fuel. Specifically, the system enables a high pressure ratio and avoids the necessity of extremely high inlet temperatures to rotary machinery.

A further consideration resides in the fact that conventional gas turbines inherently possess poor speed-response characteristics as for tractor or automotive applications. However, the system of the present invention incorporating the structure 24 responds quite rapidly to an increase in the fuel supply to the heaters 28 and 61. Accordingly, the combination represents a substantial improvement in that regard over conventional turbine systems.

As still a further consideration, the system is relatively easy to start. As disclosed in the above-referenced patent, a reservoir of starting gas may be connected to the engine side 42 of the structure 24. Starting the engine system simply involves supplying such gas from the reservoir.

Some general considerations are now appropriate. First, as the engine side 42 can be powered by heat from either the regenerator 48 or the heater 61, the temperature at the engine intake can be tailored to obtain desired operating characteristics. As a related consideration, the temperature at the intake of the turbine system 26 may have the accommodating characteristic of high-temperature tolerance, compatible with the exhaust from the heater 28. Similarly, corrosive elements from the heater 28 are more-easily accommodated by the turbine system 26 than the positive-displacement structure 24.

Certain advantages also stem from utilizing the first turbine 50 to provide motive power and the second turbine 52 as the supercharger. Specifically, response time on the output shaft 54 improves with the arrangement and the system tends to be self-regulating to a greater degree as a function of torque requirements. Somewhat summarily, the possible advantages for systems embodying the present invention are several. Specifically, the requirement is for low engine displacement. Little or minimum cooling is required. Any burner in the heat source may operate at low pressure. Low pressure at the turbine system means fewer stages or turbines. The positive-displacement structure operates in a clean environment with no substantial lubrication problems and attendant long life.

As indicated above, the system involves cooling of the positive-displacement structure. In that regard, it may be desirable to employ a combined structure as disclosed in FIG. 3. That is, the compressor side 38 is vigorously cooled through the jacket 43, and the high-pressure (relatively cool) fluid from that side is then employed to regeneratively cool the engine side 42. As indicated in FIG. 3, the exhaust line 71 from the compressor side 38 passes through a heat exchanger 73 which is in heat exchange relationship with the engine side 42. The fluid exits from the heat exchanger 73, passing to the regenerator 48 as illustrated in FIG. 2. In practice, the physical structure may vary. For example, the heat exchanger 73 may take the form of a cooling jacket on the engine side 42. By providing appropriate cooling means, compression may approach isothermal operation.

The use of the rotary compressor unit 32 in the combination enables the provision of the positive-displacement structure 24 as a much smaller unit. In that regard, the total system compares favorably in physical size with conventional internal-combustion engines. Also, with regard to internal-combustion engines, the system hereof permits the use of a lean fuel mixture in the heater 28, which may comprise various combustion systems or sources of waste heat, so as to provide substantially non-contaminating products of combustion.

As indicated above, the system hereof may be variously embodied; and accordingly, the scope hereof is as set forth in the following claims.

What is claimed is:

1. An engine system for providing mechanical power from heat energy, comprising:

positive displacement means including a positive displacement compressor and a positive displacement engine for driving said compressor;

means in series with the positive displacement means for adding heat energy to raise the temperature of a working fluid;

a rotating system including turbine means adapted to be connected to provide mechanical power; and means connecting said compressor and said engine with said rotating system to transfer said working fluid therebetween at an increased pressure of working fluid applied to said turbine means.

2. An engine system according to claim 1 wherein said series means includes a heat source connected between the engine and the turbine means to increase the temperature of working fluid entering said turbine means.

3. An engine system according to claim 1 wherein said rotating system includes a rotary compressor coupled to be driven by said turbine means for cooperation with said positive displacement compressor to increase the pressure of said working fluid applied to said turbine means.

4. An engine system according to claim 1 wherein said turbine means includes: a first turbine adapted to be connected to supply mechanical power; a second turbine coupled to receive working fluid from said first turbine; and further including a compressor means mechanically coupled to said second turbine, for cooperation with said positive displacement compressor to increase the pressure of said working fluid applied to said turbine means.

5. An engine system according to claim 4 wherein the series means includes secondary heating means for supplying heat energy to the working fluid between said first turbine and said second turbine.

6. An engine system according to claim 5 wherein the series means further includes primary heating means for providing heat to increase the temperature of working fluid entering said first turbine.

7. An engine system according to claim 1 further including a cooling means for cooling said positive displacement means.

8. An engine system according to claim 7 wherein said cooling means comprise independent cooling means for said positive displacement compressor and said positive displacement engine.

9. An engine system according to claim 7 wherein said cooling means comprises a cooling means for said positive displacement compressor and means for transferring heat from said positive displacement engine to said working fluid on exit from said positive displacement compressor.

10. An engine system according to claim 1 wherein the series means includes a regenerator for transferring heat from working fluid prior to discharge to working fluid prior to entering said positive displacement engine.

* * * * *